(12) United States Patent
Deng et al.

(10) Patent No.: US 8,855,070 B2
(45) Date of Patent: Oct. 7, 2014

(54) METHODS, SYSTEMS, AND COMPUTER READABLE MEDIA FOR IMPROVED LONG TERM EVOLUTION (LTE) HYBRID AUTOMATIC REPEAT REQUEST (HARQ) PROCESSING

(75) Inventors: Xinmin Deng, Cary, NC (US); Jong Kwan Choi, Santa Clara, CA (US); Ram Asokan, Cary, NC (US)

(73) Assignee: Ixia, Calabasas, CA (US)

( * ) Notice: Subject to any disclaimer, the term of this patent is extended or adjusted under 35 U.S.C. 154(b) by 193 days.

(21) Appl. No.: 13/326,264

(22) Filed: Dec. 14, 2011

(65) Prior Publication Data

US 2013/0155878 A1 Jun. 20, 2013

(51) Int. Cl.
*H04J 3/12* (2006.01)
*H04W 72/00* (2009.01)

(52) U.S. Cl.
USPC ............................. 370/329; 370/524; 455/450

(58) Field of Classification Search
USPC .................. 370/216, 315, 328, 329, 345, 524; 455/436, 450, 509
See application file for complete search history.

(56) References Cited

U.S. PATENT DOCUMENTS

| 5,561,841 | A | 10/1996 | Markus |
| 5,850,386 | A | 12/1998 | Anderson et al. |
| 6,771,957 | B2 | 8/2004 | Chitrapu |
| 6,996,772 | B2 | 2/2006 | Justice et al. |
| 7,543,054 | B1 | 6/2009 | Bansod et al. |
| 7,765,313 | B2 | 7/2010 | Jain et al. |
| 2006/0276195 | A1 | 12/2006 | Nordling |
| 2009/0077456 | A1 | 3/2009 | Pi et al. |
| 2009/0077457 | A1 | 3/2009 | Ramesh et al. |
| 2009/0196244 | A1 | 8/2009 | Chun et al. |
| 2009/0245187 | A1* | 10/2009 | Nam et al. ..................... 370/329 |
| 2010/0075678 | A1* | 3/2010 | Akman et al. ................ 455/436 |
| 2010/0165847 | A1 | 7/2010 | Kamuf et al. |
| 2010/0184447 | A1 | 7/2010 | Miki et al. |
| 2010/0195743 | A1 | 8/2010 | Barsoum et al. |
| 2010/0272011 | A1 | 10/2010 | Palanki et al. |
| 2010/0290371 | A1 | 11/2010 | Beale |
| 2010/0303011 | A1 | 12/2010 | Pan et al. |
| 2011/0032925 | A1* | 2/2011 | Lee et al. ...................... 370/345 |
| 2011/0044196 | A1* | 2/2011 | Ishii .............................. 370/252 |
| 2011/0086659 | A1 | 4/2011 | Yoon et al. |
| 2011/0119552 | A1 | 5/2011 | Park et al. |
| 2011/0158333 | A1 | 6/2011 | Nakano et al. |

(Continued)

OTHER PUBLICATIONS

Non-Final Office Action for U.S. Appl. No. 13/431,975 (May 24, 2013).

(Continued)

*Primary Examiner* — Michael Thier
*Assistant Examiner* — Prince A Mensah
(74) *Attorney, Agent, or Firm* — Jenkins, Wilson, Taylor & Hunt, P.A.

(57) ABSTRACT

Methods, systems, and computer readable media for performing long term evolution (LTE) hybrid automatic repeat request (HARQ) processing are disclosed. According to one method, the method occurs at a multi-UE simulator. The method includes receiving downlink control channel data for a plurality of user devices being simulated. The method also includes decoding HARQ data for each user device of the plurality of user devices. The method further includes performing at least one HARQ data verification step for each user device of the plurality of user devices and acting on the verified HARQ data for each user device of the plurality of user devices.

15 Claims, 7 Drawing Sheets

(56) References Cited

U.S. PATENT DOCUMENTS

| | | | |
|---|---|---|---|
| 2011/0170439 A1 | 7/2011 | Miki et al. | |
| 2011/0206151 A1 | 8/2011 | McCloud et al. | |
| 2011/0235586 A1* | 9/2011 | Han et al. | 370/328 |
| 2012/0033650 A1 | 2/2012 | Ahn et al. | |
| 2012/0042226 A1 | 2/2012 | Ramesh et al. | |
| 2012/0051271 A1 | 3/2012 | Beale | |
| 2012/0063384 A1 | 3/2012 | Bi et al. | |
| 2012/0093249 A1 | 4/2012 | Sun et al. | |
| 2012/0094651 A1 | 4/2012 | Chun et al. | |
| 2012/0150521 A1 | 6/2012 | Balkwill | |
| 2012/0170524 A1* | 7/2012 | Ren et al. | 370/329 |
| 2012/0204081 A1 | 8/2012 | Fresia et al. | |
| 2013/0010724 A1 | 1/2013 | Han et al. | |
| 2013/0024753 A1 | 1/2013 | Masuda et al. | |
| 2013/0034062 A1 | 2/2013 | Seo et al. | |
| 2013/0058240 A1 | 3/2013 | Kim et al. | |
| 2013/0058294 A1 | 3/2013 | Miki et al. | |
| 2013/0058306 A1 | 3/2013 | Noh et al. | |
| 2013/0060735 A1 | 3/2013 | Haddy et al. | |
| 2013/0070689 A1 | 3/2013 | Liu et al. | |
| 2013/0070690 A1 | 3/2013 | Moon et al. | |
| 2013/0088973 A1 | 4/2013 | Yang et al. | |
| 2013/0115987 A1 | 5/2013 | Yoo et al. | |
| 2013/0121168 A1 | 5/2013 | Luo et al. | |
| 2013/0121295 A1 | 5/2013 | Saito et al. | |
| 2013/0155867 A1 | 6/2013 | Asokan et al. | |
| 2013/0155872 A1 | 6/2013 | Subramanian et al. | |
| 2013/0184023 A1 | 7/2013 | Asokan et al. | |
| 2013/0208600 A1 | 8/2013 | Campbell et al. | |
| 2013/0208603 A1 | 8/2013 | Choi et al. | |
| 2013/0227092 A1 | 8/2013 | Maestas | |
| 2013/0227233 A1 | 8/2013 | Asokan | |
| 2013/0275606 A1 | 10/2013 | Iyer | |

OTHER PUBLICATIONS

Commonly assigned, co-pending U.S. Appl. No. 13/447,160 for "Methods, Systems, and Computer Readable Media for Heuristics-Based Adaptive Protocol Parsing," (Unpublished, filed Apr. 13, 2012).

Commonly assigned, co-pending U.S. Appl. No. 13/431,975 for "Methods, Systems, and Computer Readable Media for Dyanmically Controlling a Turbo Decoding Process in a Long Term Evolution (LTE) Multi-User Equipment (UE) Traffic Simulator," (Unpublished, filed Mar. 28, 2012).

Commonly assigned, co-pending U.S. Appl. No. 13/429,384 for "Scalable Architecture for Multiple User Equipment (Multi-UE) Simulation," (Unpublished, filed Mar. 25, 2012).

Commonly assigned, co-pending U.S. Appl. No. 13/408,787 for "Methods, Systems, and Computer Readable Media for Integrated Sub-Block Interleaving and Rate Matching," (Unpublished, filed Feb. 29, 2012).

Commonly assigned, co-pending U.S. Appl. No. 13/396,577 for "Methods, Systems, and Computer Readable Media for Performing Long Term Evolution (LTE) Channel Delineation," (Unpublished, filed Feb. 14, 2012).

Commonly assigned, co-pending U.S. Appl. No. 13/371,389 for "Methods, Traffic Simulators, and Computer Readable Media for Validating Long Term Evolution (LTE) Code Blocks and Transport Blocks," (Unpublished, filed Feb. 10, 2012).

Commonly assigned, co-pending U.S. Appl. No. 13/352,058 for "Methods, Systems, and Computer Readable Media for Long Term Evolution (LTE) Uplink Data Processing," (Unpublished, filed Jan. 17, 2012).

Commonly assigned, co-pending U.S. Appl. No. 13/336,005 for "Methods, Systems, and Computer Readable Media for Reducing the Impact of False Downlink Control Information (DCI) Detection in Long Term Evolution (LTE) Physical Downlink Control Channel (PDCCH) Data," (Unpublished, filed Dec. 23, 2011).

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 9)," 3GPP TS 36.300 v9.9.0 (Dec. 2011).

"3rd Generation Partnership Project; Universal Mobile Telecommunications Systems (UMTS); Evolved Universal Terrestrial Radio Access (E-UTRA); Physical layer for relaying operation (Release 10),"3GPP TS 36.216, v10.3.1 (Sep. 2011).

"3rd Generation Partnership Project; Technical Specification Group Radio Access Network; Evolved Universal Terrestrial Radio Access (E-UTRA); Physical layer procedures (Release 10)," 3GPP TS 36.213, V10.3.0 (Sep. 2011).

"3rd Generation Partnership Project; Technical Specification Group Radio Access Network; Evolved Universal Terrestrial Radio Access (E-UTRA); Multiplexing and channel coding (Release 10)," 3GPP TS 36.212, V10.3.0 (Sep. 2011).

"3rd Generation Partnership Project; Technical Specification Group Radio Access Network; Evolved Universal Terrestrial Radio Access (E-UTRA); Physical Channels and Modulation (Release 10)," 3GPP TS 36.211, V10.3.0 (Sep. 2011).

"LTE; Evolved Universal Terrestrial Radio Access (E-UTRA); Physical layer; Measurements (3GPP TS 36.214 version 10.1.0 Release 10)," ETSI TS 136 214, V10.1.0 (Apr. 2011).

Third Generation Partnership Project, "Technical Specification Group Radio Access Network; Evolved Universal Terrestrial Radio Access (E-UTRA); LTE Physical Layer; General Description," 3GPP TS 36.201.v10.0.0, Release 10 (Dec. 2010).

"IxCatapult Chassis," http://www.ixiacom.com/products/display?skey=ch_ixcatapult, pp. 1-2 (Downloaded from the Internet Apr. 14, 2010).

"Wireless Network Testing," Ixia, 915-2623-01 Rev A, pp. 1-18 (Jan. 2010).

"Wireless Network Testing," Ixia, 915-2622-01 Rev A, pp. 1-16 (Jan. 2010).

"3rd Generation Partnership Project; Technical Specification Group Radio Access Network; Requirements for Evolved UTRA (E-UTRA) and Evolved UTRAN (E-UTRAN) (Release 9)," 3GPP TR 25.913, v9.0.0 (Dec. 2009).

"PDCCH Blind Decoding," PDCCH Decoding Example, http://www.steepestascent.com, pp. 1-6 (Copyright 2009-2011, downloaded from the Internet Dec. 4, 2011).

Notice of Allowance and Fee(s) Due for U.S. Appl. No. 13/396,577 (Dec. 18, 2013).

Non-Final Office Action for U.S. Appl. No. 13/447,160 (Nov. 8, 2013).

Non-Final Office Action for U.S. Appl. No. 13/431,975 (Oct. 10, 2013).

Non-Final Office Action for U.S. Appl. No. 13/154,166 (Aug. 19, 2013).

Non-Final Office Action for U.S. Appl. No. 13/396,577 (Aug. 8, 2013).

Radio Electronics, "LTE CA: Carrier Aggregation Tutorial," pp. 1-7 http://www.radio-electronics.com/info/cellulartelecomms/lte-long-term-evolution/4g-lte-advanced-carrier-channel-aggregation.php (Printed from the Internet Aug. 7, 2013).

Share Technote, "Frame Structure—Downlink," pp. 1-11 http://www.sharetechnote.com/html/FrameStructure_DL.html#PCFICH (Printed from the Internet Aug. 7, 2013).

Non-Final Office Action for U.S. Appl. No. 13/336,005 (Jul. 2, 2013).

Commonly assigned, co-pending U.S. Appl. No. 13/835,658 for "Methods, Systems, and Computer Readable Media for Utilizing Adaptive Symbol Processing in a Multiple User Equipment (Multi-UE) Simulator," (unpublished, filed Mar. 15, 2013).

3rd Generation Partnership Project, "Technical Specification Group Radio Access Network; Evolved Universal Terrestrial Radio Access (E-UTRA); Physical layer procedures (Release 11)," 3GPP TS 36.213, V11.2.0, pp. 1-173 (Feb. 2013).

3rd Generation Partnership Project, "Technical Specification Group Radio Access Network; Evolved Universal Terrestrial Radio Access (E-UTRA); Multiplexing and channel coding (Release 11)," 3GPP TS 36.212, V11.2.0, pp. 1-18 (Feb. 2013).

3rd Generation Partnership Project, "Technical Specification Group Radio Access Network; Evolved Universal Terrestrial Radio Access (56) References Cited

OTHER PUBLICATIONS (E-UTRA); Physical Channels and Modulation (Release 11)," 3GPP TS 36.211, V11.2.0, pp. 1-109 (Feb. 2013).
3rd Generation Partnership Project, "Technical Specification Group Radio Access Network; Evolved Universal Terrestrial Radio Access (E-UTRA); Physical layer; Measurements (Release 11)," 3GPP TS 36.214, V11.1.0, pp. 1-14 (Dec. 2012).
3rd Generation Partnership Project, "Technical Specification Group Radio Access Network; Evolved Universal Terrestrial Radio Access (E-UTRA); LTE physical layer; General description (Release 11)," 3GPP TS 36.201, V11.1.0, pp. 1-13 (Dec. 2012).
3rd Generation Partnership Project, "Technical Specification Group Radio Access Network; Evolved Universal Terrestrial Radio Access (E-UTRA); Physical layer for relaying operation (Release 11)," 3GPP TS 36.215, V11.0.0, pp. 1-16 (Sep. 2012).
Xiao et al., "IMS Network Deployment Cost Optimization Based on Flow-Based Traffic Model," IEEE/IFIP Network Operations and Management Symposium—NOMS 2010, pp. 232-239 (2010).
"Network Topology," http://web.archive.org/web/20081219235147/ http://en.wikipedia.org/wiki/Network_topology, pp. 1-9 (Dec. 19, 2008).

* cited by examiner

METHODS, SYSTEMS, AND COMPUTER READABLE MEDIA FOR IMPROVED LONG TERM EVOLUTION (LTE) HYBRID AUTOMATIC REPEAT REQUEST (HARQ) PROCESSING

TECHNICAL FIELD

The subject matter described herein relates to testing communications networks. More specifically, the subject matter relates to methods, systems, and computer readable media for performing Long term evolution (LTE) HARQ processing.

BACKGROUND

Long term evolution (LTE) and other radio communications technologies can require significant infrastructure and configuration. Generally, network operators test various aspects of their network equipment to ensure reliable and efficient operation. Network operators typically simulate various conditions before equipment is deployed in a live network to decrease avoidable delays and/or other problems.

Various technical specifications, such as the 3rd Generation Partnership Project (3GPP) Technical Specifications 36.211, 36.212, 36.213, and 36.214, hereinafter respectively referred to as "TS 36.211", "TS 36.212", "TS 36.213", and "TS 36.214", define aspects of LTE communications. Generally, data from the network to a user device is referred to as downlink data and data from the user device to the network is referred to as uplink data. For example, user equipment (UE), such as a cellular mobile phone, a laptop, other user device, may communicate with an enhanced or evolved Node B (eNode B), also referred to herein as a eNB, via the cellular radio transmission link. Data that is sent from the eNode B to the user device is downlink data, and data that is sent from the user device to the eNode B is uplink data.

LTE data is usually transmitted using one or more multiplexing and/or modulation schemes. For example, in some LTE networks, downlink data is transmitted using an orthogonal frequency-division multiplexing (OFDM) and uplink data is transmitted using single carrier frequency-division multiple access (SC-FDMA). Such schemes may allow multiple streams of data to be sent simultaneously (e.g., at different frequencies). While such schemes may allow data to be communicated at high-speed, significant processing is required to encode and decode the data.

In LTE networks, receipt of physical layer uplink data by an eNode B is confirmed using hybrid automatic rapid request (HARQ) feedback (e.g., HARQ indicator (HI) bit). The HARQ feedback is sent from the eNode B to the UE to acknowledge (ACK) or negatively acknowledge (NACK) the transmission. If the UE receives an ACK, there is no need to retransmit data to the eNode B. However, if the UE receives a NACK, the UE will retransmit the data.

If the UE incorrectly decodes or interprets an ACK as a NACK, the UE will erroneously retransmit data on an uplink channel that the eNode B is not expecting. This erroneous transmission can cause radio resource collisions with other UE transmissions. Similarly, the incorrect interpretation of a NACK as an ACK leads to no retransmission when a retransmission is expected. Such problems are magnified when multiple UEs are being simulated by a multiple UE (multi-UE) simulator.

According to 3GPP specifications, each UE maintains a number of parallel HARQ processes allowing transmissions to take place continuously while waiting for HARQ feedback on the successful or unsuccessful reception of previous transmissions. In our multi-UE simulator, it is desirable to support hundreds of UEs in one sector, and therefore scalability has to be addressed. It is critical to utilize the memory and computation resources efficiently so that a large number of UEs can be supported in real time.

Accordingly, in light of these difficulties, a need exists for improved methods, systems, and computer readable media for performing LTE HARQ processing.

SUMMARY

Methods, systems, and computer readable media for performing LTE HARQ processing are disclosed. According to one method, the method occurs at a multi-UE simulator. The method includes receiving downlink control channel data for a plurality of user devices being simulated. The method also includes decoding HARQ data for each user device of the plurality of user devices. The method further includes performing at least one HARQ data verification step for each user device of the plurality of user devices and acting on the verified HARQ data for each user device of the plurality of user devices.

A system for performing LTE HARQ processing is also disclosed. The system includes an LTE node. The LTE node includes a communications interface configured to receive downlink control channel data for a plurality of user devices being simulated. The LTE node also includes an LTE HARQ processing module configured to determine, using the HARQ data, whether to initiate HARQ retransmissions associated with the LTE user devices.

The subject matter described herein may be implemented in software in combination with hardware and/or firmware. For example, the subject matter described herein may be implemented in software executed by a processor. In one exemplary implementation, the subject matter described herein may be implemented using a computer readable medium having stored thereon computer executable instructions that when executed by the processor of a computer control the computer to perform steps. Exemplary computer readable media suitable for implementing the subject matter described herein include non-transitory devices, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

As used herein, the term "node" refers to a physical computing platform including one or more processors and memory.

As used herein, the terms "function" or "module" refer to hardware, firmware, or software in combination with hardware and/or firmware for implementing features described herein.

As used herein, the term "resource block" may refer to an LTE radio frame portion or LTE data stored therein.

BRIEF DESCRIPTION OF THE DRAWINGS

The subject matter described herein will now be explained with reference to the accompanying drawings of which.

DETAILED DESCRIPTION

The subject matter described herein discloses methods, systems, and computer readable media for performing LTE HARQ processing. As set forth above, an LTE user device may maintain a number of parallel HARQ processes allowing transmissions to take place continuously while waiting for HARQ data on the successful or unsuccessful reception of previous transmissions. The status of a transmission from a UE to eNode B may be provided to the UE using a HARQ indicator (HI) in subsequent downlink data sent from eNode B to UE. For example, an HI may be represented by a single bit and may indicate a successful reception via an acknowledgement (ACK) or a binary value of '1' or may indicate an unsuccessful reception via a negative acknowledgement (NACK) or a binary value of '0.'

Problems can arise if HARQ data is erroneously interpreted. For example, if an UE misinterprets an ACK as a NACK, the UE will retransmit a corresponding medium access control (MAC) packet data unit (PDU) or a transport block. In this example, the UE may attempt to use resources from the previous transmission for the retransmission, which can cause transmission collisions because the eNode B does not expect the retransmission or the use of the resources by that UE. In another example, if an UE misinterprets a NACK as an ACK, the UE will not retransmit the PDU which requires the eNode B to send an additional NACK, further impacting LTE communications.

Advantageously, the subject matter described herein can be used to efficiently perform LTE HARQ processing for multiple user devices and to verify decoded HARQ data for each of the user devices based on HARQ data verification steps performed after the HARQ data is decoded. For example, an LTE traffic simulator, such as an LTE multiple user device (multi-UE) simulator, may simulate hundreds of UEs in a given cell sector or radio coverage area. The subject matter described herein may include a system with a shared data structure configured to maintain statuses of HARQ processes for multiple user devices. For example, the exemplary system may update statuses of HARQ processes by evaluating or decoding HARQ data (e.g., physical HARQ indicator channel (PHICH) information, such as HI bits), subsequently verifying the HARQ data using other control channel information, and dynamically allocating transmission resources based on the verified HARQ data.

In some embodiments, the subject matter described herein may include an "undetected" status indicator (e.g., in addition to ACK and NACK status indicators) for indicating that HARQ data is inconclusive. For example, after or during decoding PHICH information, an exemplary system, or decoder therein, may determine that some PHICH information is not ascertainable (e.g., accurately decodable). For instance, the signal carrying the PHICH information may be too weak, affected by interference, or other quality issues. As such, the system may associate an "undetected" status indicator with HARQ processes that correspond to the inconclusive HARQ data (e.g., HIs).

By using an "undetected" or "inconclusive" status indicator, the exemplary system may reduce the effects of misinterpreting HARQ data (e.g., ACKs as NACKs). For example, instead of initiating retransmissions automatically for inconclusive HARQ data, the system may perform additional actions (e.g., HARQ data verification steps) to determine whether a retransmission is required. For example, if an exemplary system has determined that an HI for a particular transmission was inconclusive, the exemplary system may examine DCI or grant information to determine whether resources previously associated with that particular transmission are reallocated to another UE or transmission. If the resources have been reallocated, the system may assume that the particular transaction was successfully received by eNode B and may change the HARQ process status associated with that transaction to an ACK. In another example, a resource conflict check may be performed regardless of HI status.

In some embodiments, the subject matter described herein may include determining metrics associated with Hs or related transmissions. For example, a probability metric may be used for indicating the likelihood of a HARQ indicator being correctly decoded or for a transmission being necessary. In another example, a priority metric may be used for indicating among various active HARQ processes or corresponding data. In some embodiments, probability metrics and priority metrics may refer to factors used in determining which, and in what order, data is transmitted.

In some embodiments, the subject matter described herein may include detecting whether resource conflicts exist and may drop lesser probable transmissions or retransmissions. For example, an exemplary system may associate metrics with HARQ data for indicating probability among various active HARQ processes or corresponding data (e.g., PDUs or transport blocks). In this example, probability may be for indicating the likelihood of a HARQ indicator being correctly decoded, e.g., in In situations where two retransmissions are allocated to use the same resources, the system may determine, using probability metrics, which data has a higher priority. After determining probability metrics, the more probable data may be transmitted using the resources, while the less probable may not be transmitted. Hence, by avoiding unnecessary retransmissions and reducing resource conflicts, a system according to the subject matter described herein can efficiently perform LTE HARQ processing for multiple user devices.

Figure 1:
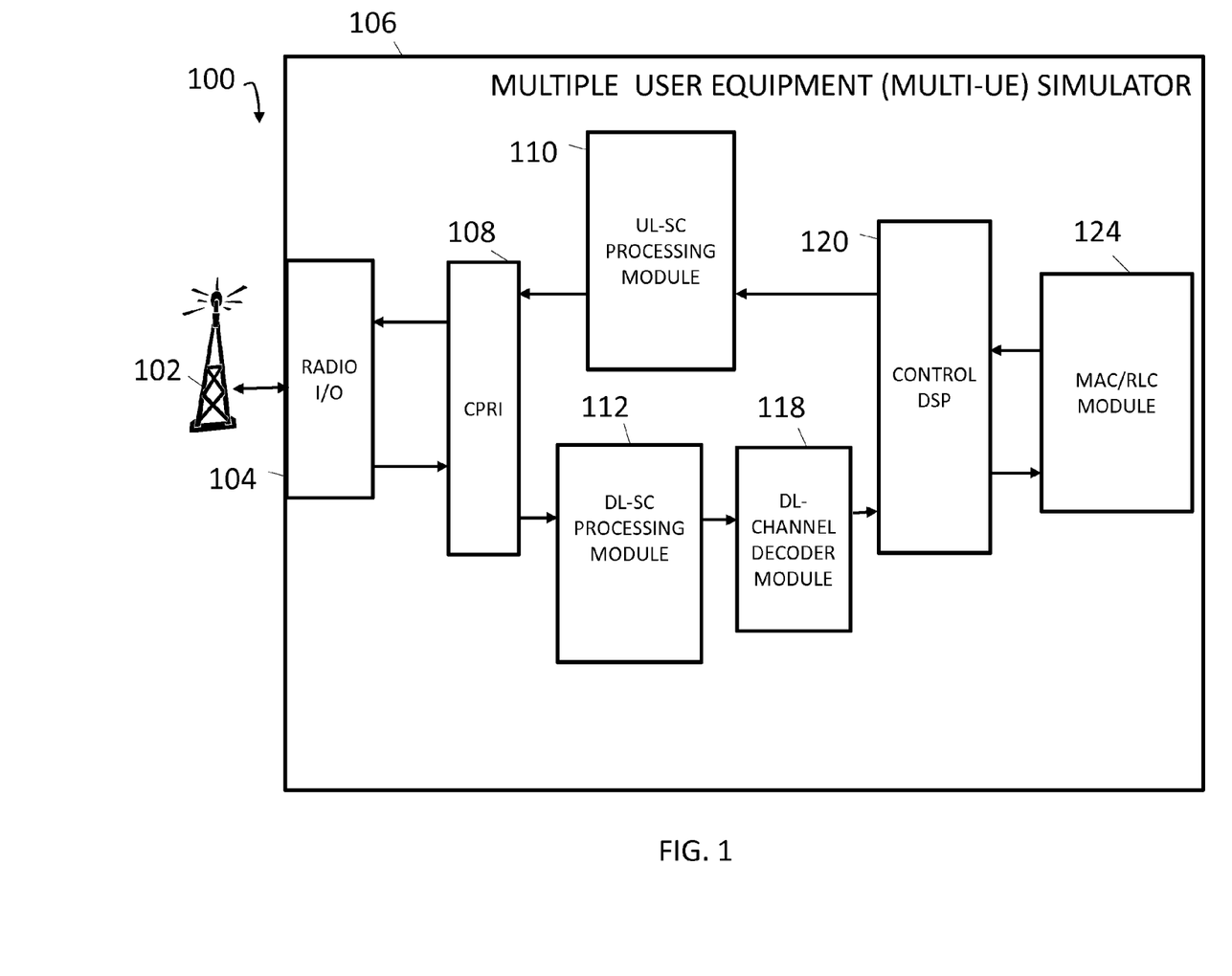
FIG. 1 is a diagram illustrating an exemplary device for performing LTE HARQ processing according to an embodiment of the subject matter described herein.

FIG. 1 is a diagram illustrating an exemplary LTE network 100 for performing LTE HARQ processing according to an embodiment of the subject matter described herein. Network 100 may include an eNode B 102 and a multi-UE simulator 106. ENode B 102 may represent any suitable entity (e.g., a base transceiver station (BTS), node B, etc.) for providing data via an air interface. For example, eNode B 102 may be an LTE mobile network entity having functionality similar to that of a radio network controller (RNC) and a base station (BS) in 2G networks or an RNC and a Node B in 3G mobile networks. In some embodiments, eNode B 102 may communicate directly with LTE user devices and is responsible for header compression, ciphering, reliable delivery of packets, admission control, and radio resource management. ENode B 102 may also communicate with various other modules and/or nodes, e.g., radio head 104 and/or multi-UE simulator 106.

Multi-UE simulator 106 may be any suitable entity (e.g., a stand-alone node or distributed multi-node system) configured to simulate one or more LTE user devices, to send communications to eNode B 102, to receive communications from eNode B 102, and/or to test communications capabilities of eNode B 102. For example, multi-UE simulator 106 may be used for simulating network load conditions and analyzing performance of eNode B 102 and/or network nodes under the simulated conditions. In some embodiments, multi-UE simulator 106 may be a single node or may be distributed across multiple computing platforms or nodes. Multi-UE simulator 106 may include various modules for performing one or more aspects described herein. Multi-UE simulator 106 may include a radio input/output (I/O) module (e.g., a radio head) 104, a CPRI module 108, an uplink signaling chain (UL-SC) processing module 110, a downlink signaling chain (DL-SC) processing module 112, a downlink channel decoder module 118, a control digital signaling processing (DSP) module (control DSP) 120, and a media access control and/or radio link controller (MAC/RLC) module 124. It will be appreciated that modules may include various components. For example, each of modules 108-124 may be a field-programmable gateway array (FPGA), an application-specific integrated circuit (ASIC), or software executing on a processor.

Radio head 104 may represent any suitable entity for controlling and/or performing radio I/O functions; e.g., sending or receiving communications from eNode B 102 or multi-UE simulator 106. In some embodiments, radio head 104 may be distinct from or integrated with multi-UE simulator 106. Radio head 104 may perform analog-to-digital/digital-to-analog conversion. Radio head 104 may also include operation and management processing capabilities and a standardized optical interface to connect to one or more components. Radio head 104 may communicate using various communications protocols. For example, radio head 104 may be connected to multi-UE simulator 106 via a fiber optic cable using a common public radio interface (CPRI) protocol or may be connected via another interface or using other protocols. Data transmitted over a CPRI link may consist of digitized samples of the analog baseband signal, plus a low bandwidth control channel. Data carried over the CPRI link may be a continuous stream of numbers, representing the digitized samples of the baseband waveform. A CPRI connection may support several antennas, where one or more antennas may represent a sector or a multiple-input and multiple-output (MIMO) antenna of a sector.

Radio head 104 may also communicate with eNode B 102 using various protocols. For example, radio head 104 may receive or send data via an air interface using OFDM or SC-FDMA.

CPRI module 108 may be any suitable entity (e.g., a communications interface) for communicating with radio head 104 and/or other network entity via CPRI or other protocols. For example, a wired connection (e.g., a fiber optic cable) may be used in communicating data between radio head 104 and CPRI module 108. In another example, such as in test environments, a wired connection may be used to connect CPRI 108 and eNode B 102, thereby bypassing radio head 104. On the downlink, CPRI module 108 may convert the LTE downlink data into digitalized data portions, such as frames or subframes. In some embodiments, CPRI module 108 may convert an OFDM signal and periodically (e.g., every seventy one micro seconds) or aperiodically (e.g., when data is available) provide a digitalized data portion to other modules, or sub-modules therein. Generally, receiving modules may attempt to process a digitalized data portion (e.g., an OFDM symbol) prior to another digitalized data portion being provided by CPRI module 108. On the uplink, CPRI module 108 may collect digitalized data portions, such as SC-FDMA symbols, into subframes and frames. CPRI module 108 may transmit the SC-FDMA signal towards eNode B 102 via radio head 104.

UL-SC processing module 110 may be any suitable entity (e.g., an ASIC, an FPGA, or software executing on a processor) used in processing uplink data (e.g., simulated user device traffic data). For example, UL-SC processing module 110 may perform one or more aspects associated with uplink baseband processing for sending traffic towards eNode B 102. UL-SC processing module 110 may perform data integrity operations (e.g., generating and inserting cyclic redundancy check (CRC) values for TBs or portions thereof), LTE channel data mapping or encoding, multiplexing operations, rate matching, interleaving, and/or other data processing.

DL-SC processing module 112 may be any suitable entity (e.g., an ASIC, an FPGA, or software executing on a processor) used in processing downlink data (e.g., data from eNode B 102). For example, DL-SC processing module 112 may perform one or more aspects associated with downlink baseband processing for data transmitted from eNode B 102. DL-SC processing module 112 may perform data integrity operations (e.g., checking and removing CRC values), LTE channel data de-mapping or decoding, de-multiplexing operations, and/or other data processing.

In some embodiments, DL-SC processing module 112 may perform channel de-mapping or delineation. For example, LTE data (e.g., data portions of a radio subframe) may be associated with various LTE channels. Data for particular channels may be noncontiguous and/or change relative locations often, e.g., every subframe. Channel delineation may involve identifying LTE data associated with particular LTE channels and/or providing the data to corresponding physical channels or buffers.

Exemplary LTE channels and/or signals may include a physical broadcast channel (PBCH), physical control format indicator channel (PCFICH), a physical downlink control channel (PDCCH), a physical hybrid ARQ indicator channel (PHICH), a physical downlink shared channel (PDSCH), a physical multicast channel (PMCH), a reference signal (RS), a cell-specific reference signal (CSRS), a primary synchronization channel (PSS), a secondary synchronization channel (SSS), a physical uplink shared channel (PUSCH), a physical uplink control channel (PUCCH), a sound reference signals (SRS), and demodulation reference signals (DMRS), a downlink channel, and/or an uplink channel.

DL-SC processing module 112 may be used in symbol processing (e.g., control symbols and/or shared channel symbols). For example, DL-SC processing module 112 may read, access, or otherwise identify parameters stored in a radio subframe. DL-SC processing module 112 may use parameters or other variables for extracting control information and downlink data. Exemplary variables may include a system subframe value, a PHICH group number (Ng) value, a bandwidth value (BW) value, a physical cell identity (ID), or a PHICH duration value.

In some embodiments, DL-SC processing module 112 may decode channel data or resource elements prior to performing additional decoding operations. For example, PCFICH data may be decoded before some information (e.g., a control symbol number parameter value) is determinable. DL-SC processing module 112 may communicate with various other modules (e.g., control DSP 120). For example, DL-SC processing module 112 may send signaling control information (e.g., downlink control information (DCI) and/or parameters to control DSP 120. Control DSP 120 and/or DL-SC processing module 112 may use the DCI to determine, among other things, what resources (e.g., frequencies, time slots, etc.) that eNode B 102 is allowing the user device to use for uplink and downlink, which is referred to as grant information, because eNode B 102 is granting the use of a specified subset of transmission resources to the user device. Depending on how much data the user device wants to send or receive, how many other user devices are trying to access the same eNode B, and other factors, the grant information may, and usually does, change rapidly over time. Downlink channel decoder module 118 may be any suitable entity (e.g., an ASIC, an FPGA, or software executing on a processor) used in decoding downlink data. For example, downlink channel decoder module 118 may include a FPGA or processor configured to perform turbo decoding of downlink data.

Control DSP 120 may be any suitable entity (e.g., an ASIC, an FPGA, or software executing on a processor) configurable for controlling the overall operation of simulator 106, for simulating the LTE physical layer, and for processes uplink and downlink data to separate the data into data intended for upper layers and control information. For example, Control DSP 120 may perform one or more aspects associated with uplink baseband processing and/or downlink baseband processing. Control DSP 120 may perform data integrity operations (e.g., checking and removing CRC values), code segmentation, and/or other data processing. Control DSP 120 may also act as an access controller and may provide data to MAC/RLC module 124.

Control DSP 120 may receive control information associated with a data portion (e.g., a radio subframe). Control DSP 120 and/or another module may use the DCI to determine, among other things, what resources (e.g., frequencies, time slots, etc.) that eNode B 102 is allowing the user device to use for uplink and downlink, which is referred to as grant information, because eNode B 102 is granting the use of a specified subset of transmission resources to the user device. Depending on how much data the user device wants to send or receive, how many other user devices are trying to access the same eNode B, and other factors, the grant information may, and usually does, change rapidly over time. Control DSP 120 may also provide resource information, including grant information, to various modules, such as UL-SC processing module 110 and/or MAC/RLC module 124.

In some embodiments, control DSP 120, or modules therein, may perform HARQ processing associated with multiple user devices. For example, control DSP 120 may include functionality for managing HARQ processes for multiple LTE user devices, for processing PDCCH information (e.g., scheduling and/or grant information), for processing PHICH information (e.g., HARQ indicators (Hs) or feedbacks), and for scheduling or transmitting PUSCH data (e.g., scheduling data for HARQ retransmissions). MAC/RLC module 124 may be any suitable entity (e.g., a processor) for performing various actions, such as interfacing with higher layers involved in LTE communications and data processing. For example, MAC/RLC module 124 may include a processor or a microcontroller. MAC/RLC module 124 may include medium access control (MAC) layer and radio link control (RLC) layer functions. MAC/RLC module 124 may receive decoded downlink data and send the data through a media access control (MAC) layer and radio link control (RLC) layer. MAC/RLC module 124 may also receive uplink data from higher layer and perform RLC and MAC layer operations. The uplink data (e.g., TB) may be sent to other modules, e.g., DSP 120 and/or UL-SC processing module 110, for appropriate processing. In some embodiments, uplink data may be provided by MAC/RLC module 124 in groups of data called TBs. The size of TBs provided by MAC/RLC module 124 may be defined or determined by grant information received from eNode B 102. MAC/RLC module 124 and/or control DSP 120 may send TBs to UL-SC processing module 110 for further processing. At UL-SC processing module 110, for each TB, a CRC may be generated before the TB is split or segmented into smaller CBs. A CRC may also be generated for each CB. Each CB may be channel encoded, interleaved, and rate matched. The rate matched CBs may be concatenated and multiplexed with control information before being mapped to an appropriate resource. The resource-mapped data after modulation may be sent to CPRI module 108 and transmitted (e.g., as an SC-FDMA signal) via an air interface to eNode B 102.

It will be appreciated that the above described modules are for illustrative purposes and that features or portions of features described herein may be performed by different and/or additional modules, components, or nodes. For example, a control decoder module may incorporate or include functionality of channel decoder 118 and control DSP 120.

Figure 2:
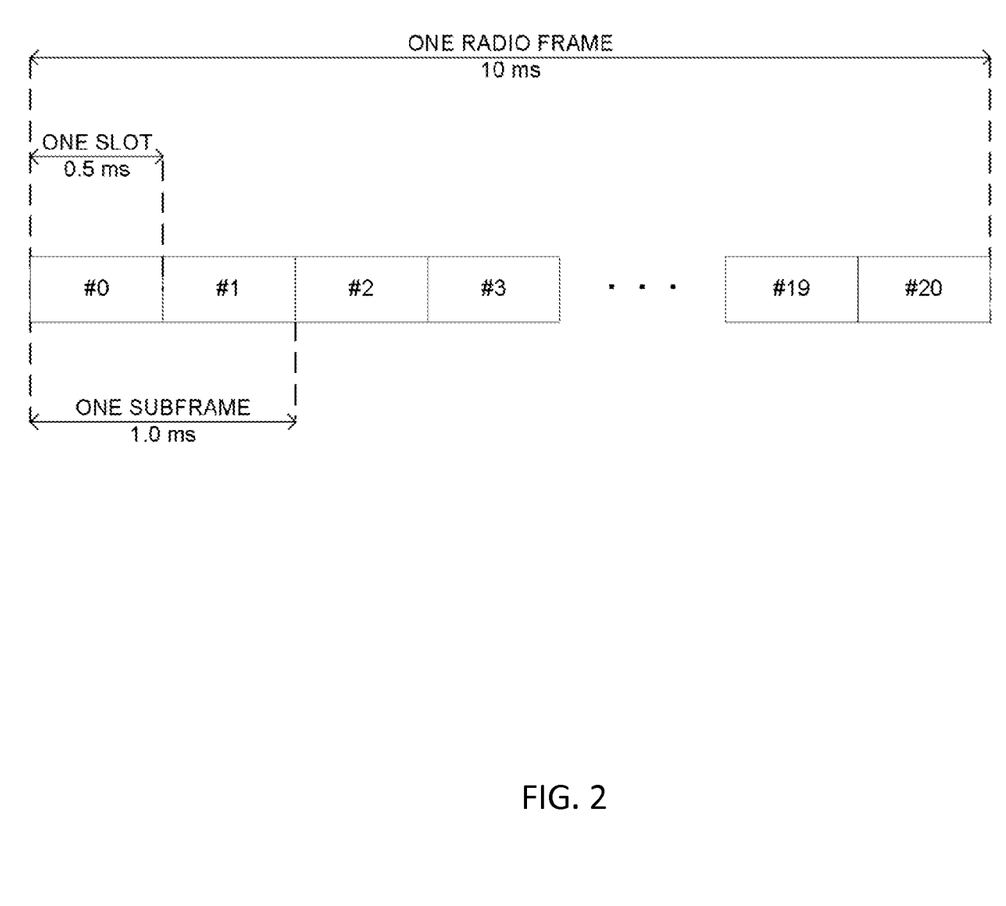
FIG. 2 is a diagram illustrating logical data portions of an LTE radio frame.

FIG. 2 is a diagram illustrating logical data portions of an LTE radio frame. As stated above, uplink and downlink data may be transmitted or sent in LTE radio frames, e.g., from eNode B 102 via radio head 104 to multi-UE simulator 106 or vice versa. Each LTE radio frame may be 10 milliseconds (ms) long comprising 10 subframes of 1 ms each. Each subframe may include 2 slots. A slot may be 0.5 ms long and may include various amounts of LTE data. LTE data may be stored as symbols in sub-carriers. A symbol in a sub-carrier may typically represent two, four, or six bits. Sub-carriers may be data streams that are spaced 15 kilohertz apart from each other. A sub-carrier may typically carry data at a maximum rate of 15 kilosymbols per second (ksps). In some embodiments, a LTE downlink subframe may typically include multiple blocks of 12 sub-carriers, each with 14 symbols and may be partitioned into two equal downlink slots. Each downlink slot may include multiple blocks of 12 sub-carriers with 6 or 7 symbols per sub-carrier (e.g., depending on whether frame uses an extended cyclic prefix or a normal cyclic prefix).

In some embodiments, downlink control information (DCI) on subframe N is for PDSCH data in the same subframe. Downlink control information (DCI) on subframe N has scheduling or grant information for PUSCH in subframe N+4. Scheduling information may include grant information indicating certain resources allocated for transmission or retransmissions for data associated with various UEs. This means that a user device may have about 4 ms from the time of reception of the downlink signal to receive and process DCI and prepare UCI for transmission via the uplink signal. Within this time period, user device needs to perform downlink processing, decode the DCI, send the grant information to a higher layer, get the packet data unit (PDU), also referred to herein as a TB, segmented from the radio link control (RLC), and do all physical layer processing and perform SC-FDMA modulation for radio frequency (RF) transmission on the uplink. For reasons that will be explained below, this timing constraint poses technical challenges not only to designers of user devices but also to designers of test equipment that simulates traffic from multiple user devices. Further, finite transmission resources available for data communications may pose technical challenges for such test equipment when performing HARQ processing, including HARQ retransmissions, for multiple user devices.

Figure 3:
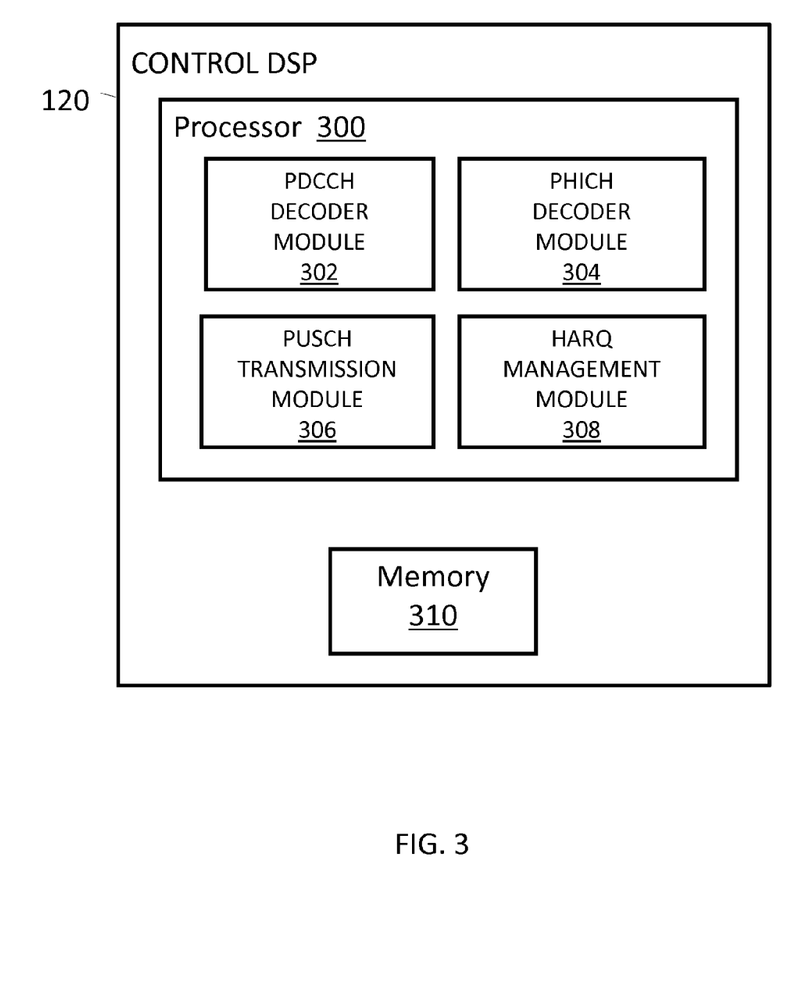
FIG. 3 is a diagram illustrating exemplary modules for performing LTE HARQ processing according to an embodiment of the subject matter described herein.

FIG. 3 is a diagram illustrating exemplary modules for performing LTE HARQ processing according to an embodiment of the subject matter described herein. In FIG. 3, control DSP 120 may include a processor 300 and memory 310. Processor 300 may be configured to perform various functions associated with HARQ processing and/or other LTE data processing. Memory 310 may be used to store various data, such as LTE communications, various state information, decoded channel data, grant information, and/or other information.

Processor 300 may be associated with a PDCCH decoder module 302, a PHICH decoder module 304, a PUSCH transmission module 306, and a HARQ management module 308. In some embodiments, each of modules 302-308 may include software executing on processor 300. In some other embodiments, one or more of modules 302-308 may include an ASIC or an FPGA distinct from processor 300.

PDCCH decoder module 302 may be any suitable entity for receiving and processing PDCCH information. For example, a radio frame, or portion thereof, may include various LTE data portions or LTE channels for various user devices. In some embodiments, PDCCH information may include DCI. DCI may include grant information (e.g., scheduling grants) that indicate resource allocation. For example, grant information may indicate transmission resources to be used for transmitting data associated with a particular user device.

In some embodiments, PDCCH decoder module 302 may perform DCI decoding and validation. For example, PDCCH decoder module 302 may decode and validate a particular scheduling grant. In this example, PDCCH decoder module 302 may also evaluate a new data indicator associated with the scheduling grant and determine whether the grant is for a new transmission or retransmission (e.g., an adaptive or non-adaptive retransmission). In some embodiments, PDCCH decoder module 302 may schedule or initiate scheduling a transmission or retransmission on the physical uplink shared channel (PUSCH), using the resources allocated in the grants. PDCCH decoder module 302 may activate or initiate activating a HARQ process for new transmission. For example, PDCCH decoder module 302 may add a new HARQ process and related information to a data structure maintaining active HARQ process. In another example, PDCCH decoder module 302 may inform HARQ management module 308 or other module and the informed module may update the data structure.

PHICH decoder module 304 may be any suitable entity for receiving and processing PHICH information. In some embodiments, PHICH information may include HARQ data, such as HIs. For example, PHICH information from a resource block (e.g., LTE radio frame portion) may include multiple HIs associated with various simulated user devices. PHICH decoder module 304 may perform PHICH decoding of the HARQ data and, when necessary, may schedule retransmissions. For example, if a NACK is decoded or detected for a given transmission, an associated PDU or transport block may be scheduled to be retransmitted on a PUSCH in a future resource block for transmission to eNode B 102.

In some embodiments, PHICH decoder module 304 may determine metrics for processed or decoded PHICH information. Metrics may include probability information usable to determine priority for transmitting or retransmitting data. In some embodiments, metrics may be based on one or more factors. Exemplary factors may include quality factors associated with a signal that carries PHICH information, such as signal to noise ratio of a carrying signal, signal strength, signal noise. Exemplary factors may also include transaction-related information, such as an associated user device, a type of data, and/or other factors.

In some embodiments, PHICH decoder module 304 may assign or associated a status to HARQ data (e.g., an HI) for indicating that the HARQ data is inconclusive. For example, PHICH decoder module 304 may assign an HI status of 'Undetected' when the incoming signal on PHICH is too weak or too noisy for PHICH decoder module 304 to determine whether an HI indicates an ACK or a NACK. Additional actions may be performed by PHICH decoder module 304 or another module in determining whether data associated with an "undetected" HI should be retransmitted.

PUSCH transmission module 306 may be any suitable entity for performing transmissions and retransmissions. PUSCH transmission module 306 may receive scheduling information from PDCCH decoder module 302 and/or PHICH decoder module 304. Using the scheduling information, PUSCH transmission module 306 may transmit or initiate transmission of PDUs or transport blocks associated with one or more HARQ processes.

In some embodiments, PUSCH transmission module 306 may generates a list of HIs to be processed by PHICH decoder module 304. For example, PUSCH transmission module 306 may require PHICH decoder module 304 to process HIs associated with received LTE radio frames, or portions thereof. In some embodiments, PUSCH transmission module 306 may detect resources allocation conflicts. For example, when the same resources are allocated for different UEs or data, a resource allocation conflict may be detected. PUSCH transmission module 306 may use various factors (e.g., type of data, whether data is associated with a retransmission or a new transmission, probability metrics) in determining which data is transmitted. For example, where PUSCH transmission module 306 detects that a resource block is allocated to two different UEs, PUSCH transmission module 306 may give priority to the UE with a new transmission, and may suspend a retransmission associated with the other UE. In another example, where PUSCH transmission module 306 detects that a resource block is allocated to two different UEs and both UEs are performing retransmissions, PUSCH transmission module 306 may determine priority based on metrics determined by PHICH decoder module 304.

HARQ management module 308 may be any suitable entity for managing HARQ processing. For example, HARQ management module 308 may maintain a data structure containing active HARQ processes for simulated user devices associated with multi-UE simulator 106. HARQ management module 308 may be responsible for activating, modifying (e.g., updating statuses of HARQ processes), and deactivating HARQ processes. For example, HARQ management module 308 may activate new HARQ processes and update the data structure when scheduling grants for new transmissions are received. In another example, HARQ management module 308 may deactivate and remove a HARQ process when the maximum number of transmissions or retransmissions is reached.

It will be appreciated that the above described control DSP 120 and related modules are for illustrative purposes and that other configurations may be possible. For example, control DSP 120 may include multiple processors and multiple types of memory. In some embodiments, exemplary modules, or portions thereof, may be located at or associated with control DSP 120. In some other embodiments, exemplary modules, or portions thereof, may be located at or associated with additional or different modules or components. For example, an LTE HARQ processing module may include functionality of each of modules 302-310 and may use a processor distinct from control DSP 120.

Figure 4:
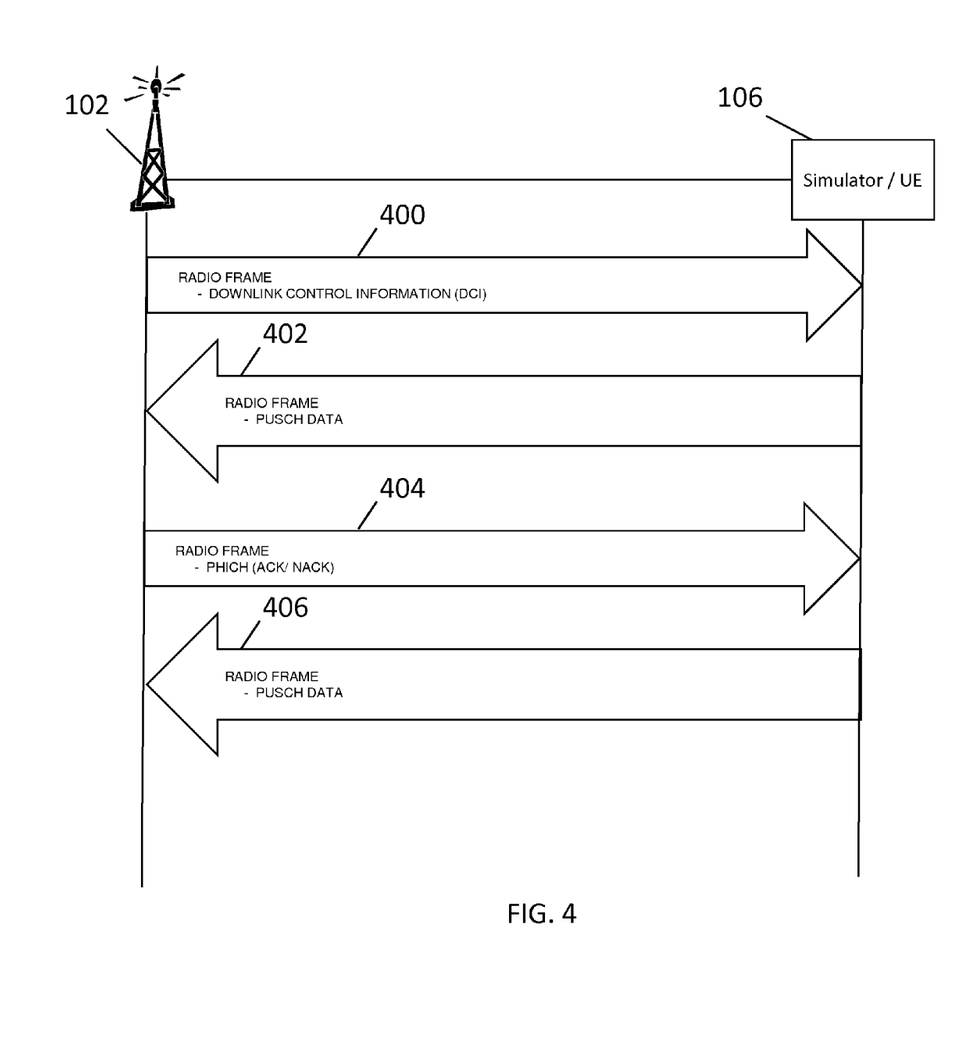
FIG. 4 is a diagram illustrating an exemplary message sequence using HARQ data according to an embodiment of the subject matter described herein.

FIG. 4 is a diagram illustrating an exemplary message sequence using HARQ data according to an embodiment of the subject matter described herein. In this embodiment, radio frames are communicated between eNode B 102 and multi-UE simulator 106. In one embodiment, one subframe is defined as a portion of a radio frame as in FIG. 2, and the radio frame and subframe can be interchangeably used. Each radio frame and/or subframe may include data or control information associated with a user device. In some embodiments, radio frames may include data or control information associated with multiple user devices. For example, PHICH information may include multiple HIs that are associated with various simulated user devices.

At step 400, eNode B 102 may send a radio frame to multi-UE simulator 106. The radio frame may include DCI. The DCI may include grant information may include information for indicating which transmission resources (e.g., frequencies, antennas, resource blocks, etc.) may be used for transmitting data associated with a particular user device. The transmission resources may be assigned to transmissions and retransmissions of data associated with one or more user devices. For example, multi-UE simulator 106 may decode control information and determine that appropriate transmission resources are available for transmitting data associated with a particular simulated user device. In some embodiments, multi-UE simulator, or a module therein (HARQ management module 308), may activate a new HARQ process for the transmission and may store appropriate information (e.g., a PDU identifier, a user device identifier, number of attempts, timestamp of attempts, radio resources assigned and/or other information).

At step 402, multi-UE simulator 106 may send a radio frame to eNode B 102. The radio frame may include data from simulated user device 'A'. The data may be stored in a PUSCH or other LTE channel. For example, multi-UE simulator 106 may use grant information to determine which transmission resources, such as LTE channel, resource block, etc., to use when transmitting the data.

At step 404, eNode B 102 may send a radio frame to multi-UE simulator 106. The radio frame may include PHICH information. The PHICH information may indicate that the data from simulated user device 'A' was not successfully received and processed (e.g., HI=0=NACK). After receiving and processing PHICH information, multi-UE simulator 106, or module therein, may schedule a retransmission of the data from simulated user device 'A'. In some embodiments, the retransmission may be an adaptive or non-adaptive retransmission depending on the LTE network and/or system configuration.

At step 406, multi-UE simulator 106 may send a radio frame including a retransmission of the data from simulated user device 'A' to eNode B 102. ENode B 102 may receive the frame and attempt to process the data. If the data is successfully processed by eNode B 102, a subsequent radio frame may be sent to multi-UE simulator 106. The subsequent radio frame may include PHICH information indicating that the data was successfully received and processed (e.g., HI=1=ACK). After receiving and processing PHICH information, multi-UE simulator 106, or module therein, may update a HARQ processing data structure and/or remove the HARQ process associated with that particular transmission from the HARQ processing data structure.

It will be appreciated that the above described message sequence is for illustrative purposes. In some embodiments, a message sequence may include additional and/or different messages.

Figure 5:
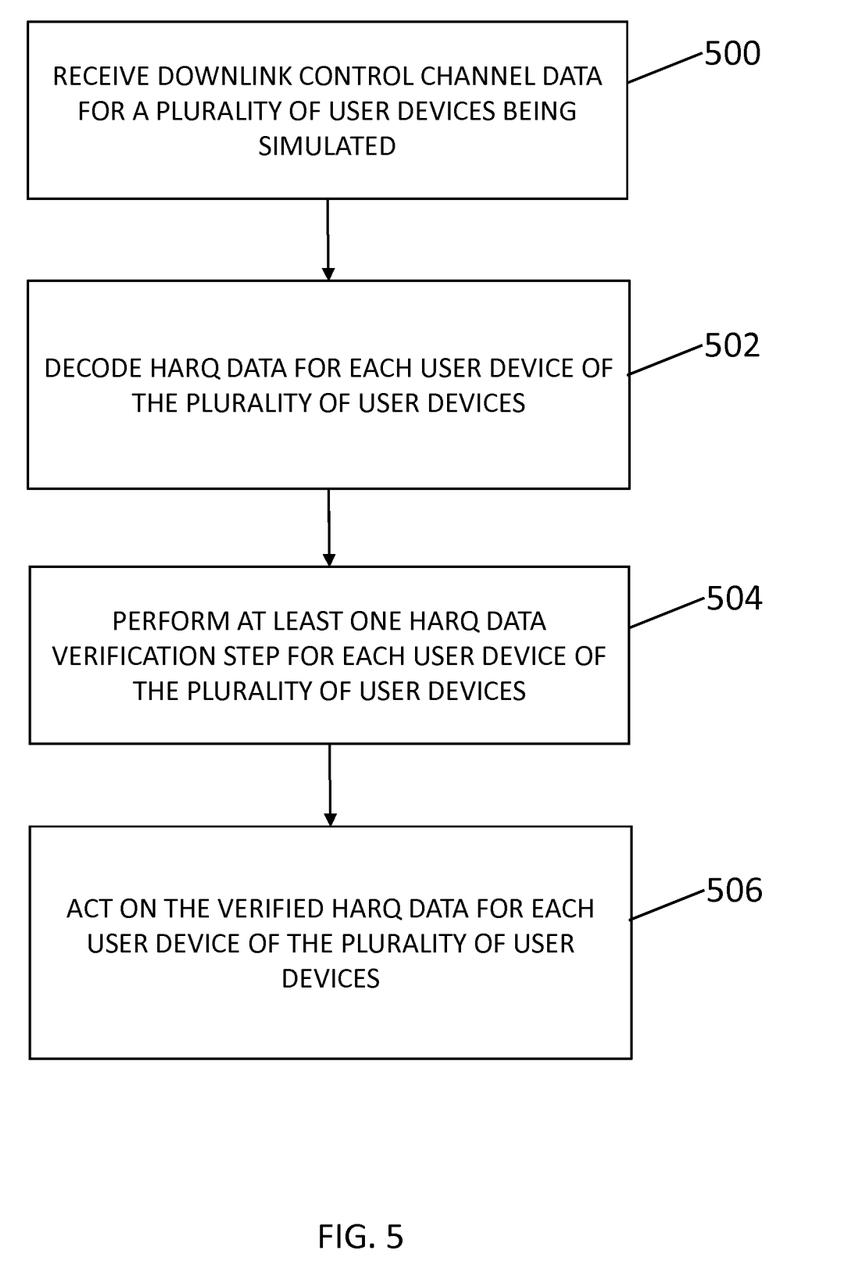
FIG. 5 is a diagram illustrating an exemplary process for performing LTE HARQ processing according to an embodiment of the subject matter described herein.

FIG. 5 is a diagram illustrating an exemplary process for performing LTE HARQ processing according to an embodiment of the subject matter described herein. In some embodiments, the exemplary process described herein, or portions thereof, may be performed by multi-UE simulator 106, control DSP 110, and/or other module(s).

In step 500, downlink control channel data may be received for a plurality of user devices being simulated. For example, an LTE radio frame may be received by an LTE node (e.g., a UE or multi-UE simulator 106), or a module therein. The LTE radio frame may include HARQ data, such as PHICH information, containing multiple HIs associated with various LTE user devices simulated by multi-UE simulator 106.

In step 502, HARQ data for each user device of the plurality of user devices may be decoded. For example, multi-UE simulator 106, or a module therein may decode physical HARQ indicator channel (PHICH) data and determine, using the decoded PHICH information, that data associated with one or more LTE user devices is to be retransmitted.

In some embodiments, decoding HARQ data for each user device of the plurality of user devices may include determining that a HARQ indicator indicates a negative acknowledgement (NACK), determining that a HARQ indicator indicates an acknowledgement (ACK), or determining that a HARQ indicator is inconclusive.

In some embodiments, determining that a HARQ indicator is inconclusive includes determining that one or more quality factors, such as a signal to noise ratio, associated with a signal containing the HARQ indicator does not meet a threshold value.

In some embodiments, decoding physical HARQ indicator channel (PHICH) data may include determining probability metrics for indicating priority among data to be retransmitted. In some embodiments, the probability metrics may be determined using one or more quality factors associated with a signal containing the PHICH information. For example, quality factors may include a signal to noise ratio, a signal strength value, or a noise value.

In step 504, at least one HARQ data verification step may be performed for each user device of the plurality of user devices. For example, where HARQ data for a user device indicates a NACK or is inconclusive, exemplary HARQ data verification steps may include determining whether a resource collision or conflict associated with scheduled transmissions or retransmissions exists, determining priorities of data associated with a resource conflict, allowing higher priority data associated with a resource conflict to use resources (e.g., retransmitting data on a PUSCH), and/or inhibiting lower priority data associated with a resource conflict to use resources. In another example, where HARQ data for a user device indicates an ACK, exemplary HARQ data verification steps may include determining whether resources previously associated with the user device has been reallocated (e.g., whether new transmission (or initial transmission or first transmission) grants using those resources to other UEs were sent by eNode B), and/or whether eNode B transmitted corresponding information to user device in response to receiving the previous transmission from the user device.

In some embodiments, performing at least one HARQ data verification step for each user device of the plurality of user devices includes determining that resources associated with retransmitting data for a user device are not allocated for transmitting other data or determining that resources associated with retransmitting data for a user device are allocated for transmitting other data and determining that the other data is a lesser priority than the data. For example, a first transport block of lesser priority may be associated with a lesser priority metric (e.g., a lower signal to noise ratio value) than a second transport block. In another example, a first transport block may be of lesser priority if the first transport block is associated with a retransmission and a second transport block is associated with a new transmission (e.g., the second transport block has not previously been sent).

In step 506, the verified HARQ data may be acted on for each user device of the plurality of user devices. For example, acting on the verified HARQ data for a user device may include scheduling a retransmission of data on a physical uplink shared channel (PUSCH) or deactivating a HARQ process associated with a transmission (e.g., in a HARQ data structure) that has been successfully received.

Figure 6:
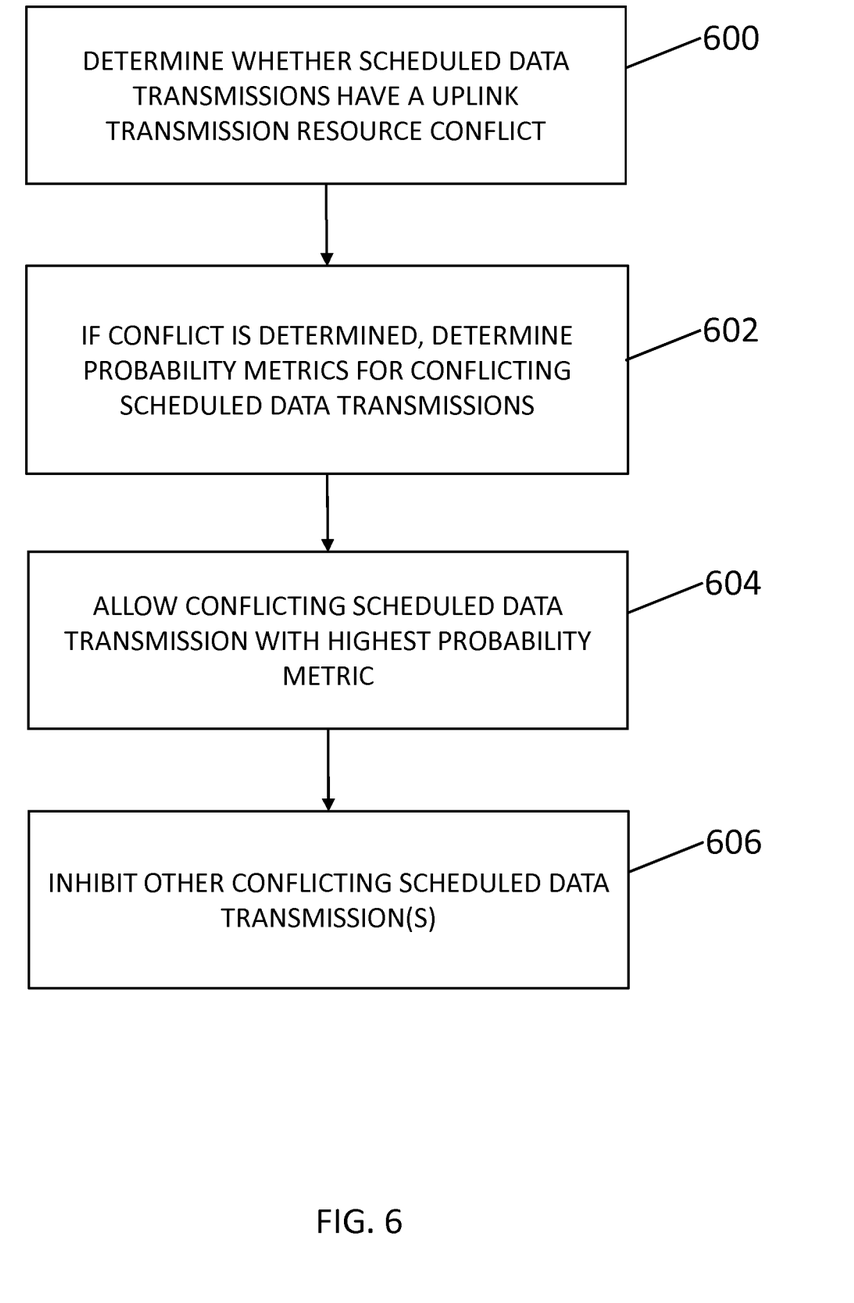
FIG. 6 is a diagram illustrating an exemplary HARQ data verification process according to an embodiment of the subject matter described herein.

FIG. 6 is a diagram illustrating an exemplary HARQ data verification process according to an embodiment of the subject matter described herein. In some embodiments, the exemplary process described herein, or portions thereof, may be performed by multi-UE simulator 106, control DSP 110, and/or other module(s).

In step 600, it may be determined whether the data transmission is associated with an uplink data transmission resource conflict. For example, PUSCH transmission module 306 may examine DCI or grant information to determine whether resources previously associated with that particular transmission are reallocated to another UE or transmission.

In step 602, if it is determined that the data transmission is associated with an uplink data transmission resource conflict, probability metrics may be determined. In some embodiments, PHICH decoder module 304 may assign "soft" values or other metrics indicating the probability or likelihood of an "undetected" HI being a NACK or ACK. In some embodiments, a new transmission may be assigned or associated with a probability metric that is higher than probability metrics associated with retransmissions.

In step 604, a scheduled conflicting data transmission with the highest probability metric may be allowed. For example, PUSCH transmission module 306 may determine that a new transmission has a higher probability metric than a retransmission and may allow the new transmission instead of the retransmission.

In step 606, other conflicting scheduled data transmission(s) may be inhibited.

Figure 7:
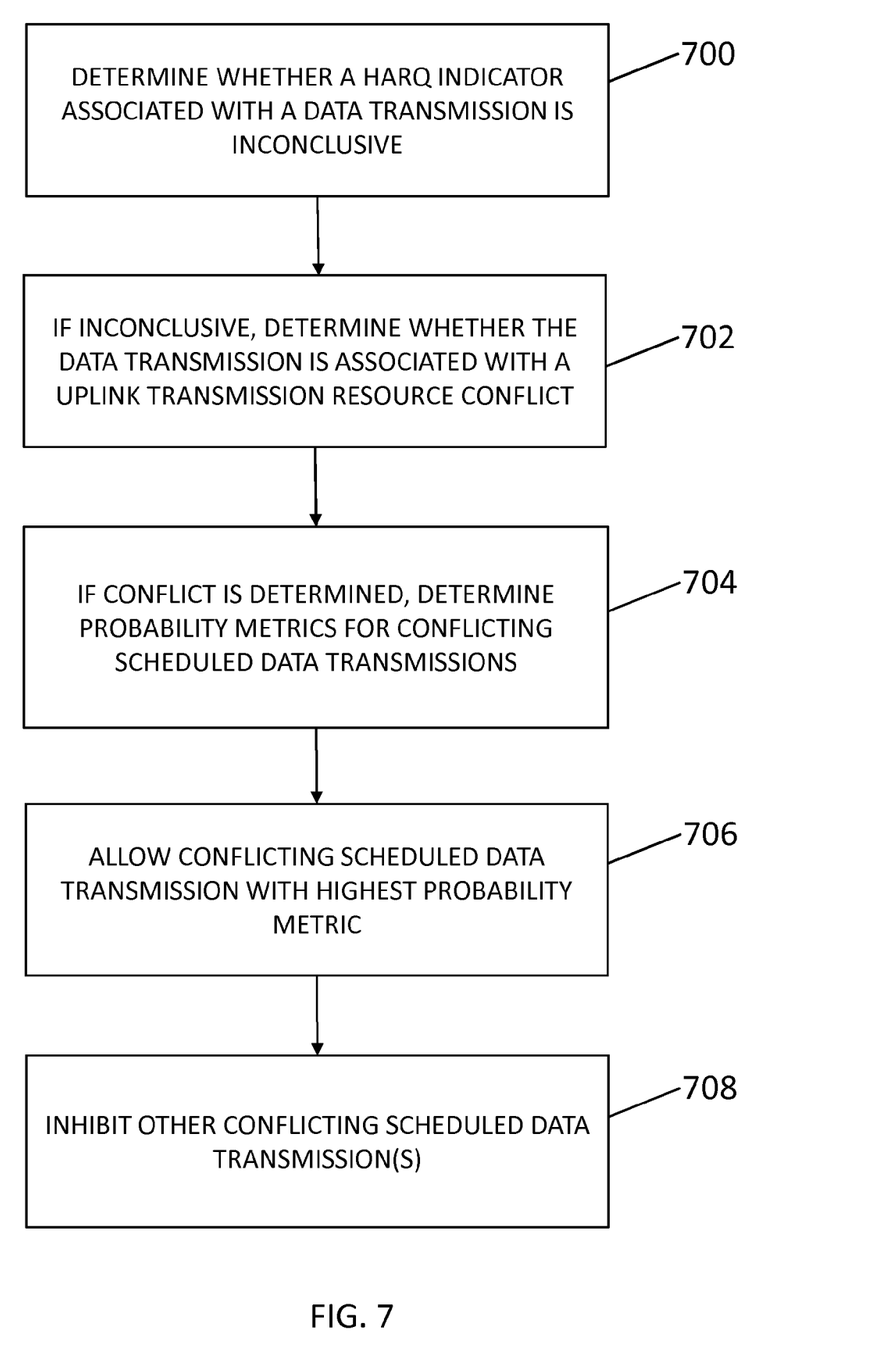
FIG. 7 is a diagram illustrating an exemplary HARQ data verification process according to another embodiment of the subject matter described herein.

FIG. 7 is a diagram illustrating an exemplary HARQ data verification process according to another embodiment of the subject matter described herein. In some embodiments, the exemplary process described herein, or portions thereof, may be performed by multi-UE simulator 106, control DSP 110, and/or other module(s).

In step 700, it may be determined whether an HI associated with a data transmission is inconclusive. For example, PHICH decoder module 304 may determine a signal associated with a decoded HI is too weak and associate the HI with an "undetected" HI status.

In step 702, if it is determined that an HI is inconclusive, it may be determined whether the data transmission is associated with an uplink data transmission resource conflict. For example, if PHICH decoder module 304 has determined that an HI for a particular transmission was inconclusive, the exemplary system may examine DCI or grant information to determine whether resources previously associated with that particular transmission are reallocated to another UE or transmission.

In step 704, if it is determined that the data transmission is associated with an uplink data transmission resource conflict, probability metrics may be determined. In some embodiments, PHICH decoder module 304 may assign "soft" values or other metrics indicating the probability or likelihood of an "undetected" HI being a NACK or ACK. For example, the "soft" values may be based on a quality factor associated with a carrying signal, such as signal to noise ratio value of PHICH channel or LTE radio frame.

In step 706, a scheduled conflicting data transmission with the highest probability metric may be allowed. For example, PUSCH transmission module 306 may determine that a retransmission associated with the highest "soft" value is allowed to use uplink resources over other conflicting retransmissions.

In step 708, other conflicting scheduled data transmission(s) may be inhibited.

In one embodiment, HARQ management module 308 and/or PUSCH transmission module always or selectively choose not to retransmit in case of "undetected" HI status. In an another embodiment, HARQ management module 308 and/or PUSCH transmission module always or selectively choose to retransmit in case of "undetected" HI status. In some other embodiments, HARQ management module 308 and/or PUSCH transmission module may, randomly and/or at defined proportions, choose between retransmission and no transmission.

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for performing long term evolution (LTE) hybrid automatic rapid request (HARQ) processing, the method comprising:
at an LTE multi-UE simulator distinct from an evolved node B and user equipment, the LTE multi-UE simulator configured to simulate a plurality of user devices:
receiving, from the evolved node B and by the LTE multi-UE simulator, downlink control channel data for the plurality of user devices being simulated, wherein the downlink control channel data includes HARQ data;
decoding, by the LTE multi-UE simulator, the HARQ data for each user device of the plurality of user devices, wherein the HARQ data indicates at least one negative acknowledgement (NACK) associated with a first user device of the plurality of user devices and at least one acknowledgement (ACK) associated with a second user device of the plurality of user devices, wherein decoding HARQ data for each user device of the plurality of user devices includes decoding physical HARQ indicator channel (PHICH) information and determining, using the decoded PHICH information, that data associated with an LTE user device is to be retransmitted and wherein decoding physical HARQ indicator channel (PHICH) data includes determining probability metrics for indicating priority among data to be retransmitted;
performing, by the LTE multi-UE simulator, at least one HARQ data verification step for each user device of the plurality of user devices;
and acting, by the LTE multi-UE simulator, on the verified HARQ data for each user device of the plurality of user devices.

2. The method of claim 1 wherein the HARQ data includes physical HARQ indicator channel (PHICH) information.

3. The method of claim 1 wherein the probability metrics are based on one or more quality factors associated with a signal containing the PHICH information.

4. The method of claim 1 wherein decoding the PHICH information includes determining that a HARQ indicator indicates a negative acknowledgement (NACK), determining that a HARQ indicator indicates an acknowledgement (ACK), or determining that a HARQ indicator is inconclusive.

5. The method of claim 1 wherein performing at least one HARQ data verification step for each user device of the plurality of user devices includes determining that resources associated with retransmitting data for a user device are not allocated for transmitting other data or determining that resources associated with retransmitting data for a user device are allocated for transmitting other data and determining that the other data is a lesser priority than the data.

6. The method of claim 4 wherein determining that a HARQ indicator is inconclusive includes determining that one or more quality factors associated with a signal containing the HARQ indicator does not meet a threshold value.

7. The method of claim 1 wherein acting on the verified HARQ data for each user device of the plurality of user devices includes scheduling a retransmission of data on a physical uplink shared channel (PUSCH) or deactivating a HARQ process associated with a transmission that has been successfully received.

8. A system for performing long term evolution (LTE) hybrid automatic rapid request (HARQ) processing, the system comprising:
   at an LTE multi-UE simulator distinct from an evolved node B and user equipment, the LTE multi-UE simulator configured to simulate a plurality of user devices, the LTE multi-UE simulator including:
   a communications interface configured to receive, from the evolved node B, downlink control channel data for the plurality of user devices being simulated, wherein the downlink control channel data includes HARQ data;
   and an LTE HARQ processing module configured to decode the HARQ data for each user device of the plurality of user devices, wherein the HARQ data indicates at least one negative acknowledgement (NACK) associated with a first user device of the plurality of user devices and at least one acknowledgement (ACK) associated with a second user device of the plurality of user devices, wherein the LTE HARQ processing module is configured to decode physical HARQ indicator channel (PHICH) information and determine, using the decoded PHICH information, that data associated with an LTE user device is to be retransmitted, and wherein the LTE HARQ processing module is configured to determine probability metrics for indicating priority among data to be retransmitted,
   to perform at least one HARQ data verification step for each user device of the plurality of user devices, and to act on the verified HARQ data for each user device of the plurality of user devices.

9. The system of claim 8 wherein the HARQ data includes physical HARQ indicator channel (PHICH) information.

10. The system of claim 8 wherein the probability metrics are based on one or more quality factors associated with a signal containing the PHICH information.

11. The system of claim 8 wherein the LTE HARQ processing module is configured to decode the PHICH information by determining that a HARQ indicator indicates a negative acknowledgement (NACK), a HARQ indicator indicates an acknowledgement (ACK), or determining that a HARQ indicator is inconclusive.

12. The system of claim 8 wherein the at least one HARQ data verification step includes determining that resources associated with retransmitting data for a user device are not allocated for transmitting other data or determining that resources associated with retransmitting data for a user device are allocated for transmitting other data and determining that the other data is a lesser priority than the data.

13. The system of claim 11 wherein the LTE HARQ processing module is configured to determine that a HARQ indicator is inconclusive in response to determining that one or more quality factors associated with a signal containing the HARQ indicator does not meet a threshold value.

14. The system of claim 8 wherein the LTE HARQ processing module is configured to act on the verified HARQ data for each user device of the plurality of user devices by scheduling a retransmission of data on a physical uplink shared channel (PUSCH) or deactivating a HARQ process associated with a transmission that has been successfully received.

15. A non-transitory computer readable medium comprising computer executable instructions embodied in the non-transitory computer readable medium that when executed by a processor of a computer control the computer to perform steps comprising:
   at an LTE multi-UE simulator distinct from an evolved node B and user equipment, the LTE multi-UE simulator configured to simulate a plurality of user devices:
   receiving, from the evolved node B and by the LTE multi-UE simulator, downlink control channel data for the plurality of user devices being simulated, wherein the downlink control channel data includes HARQ data;
   decoding, by the LTE multi-UE simulator, the HARQ data for each user device of the plurality of user devices, wherein the HARQ data indicates at least one negative acknowledgement (NACK) associated with a first user device of the plurality of user devices and at least one acknowledgement (ACK) associated with a second user device of the plurality of user devices, wherein decoding HARQ data for each user device of the plurality of user devices includes decoding physical HARQ indicator channel (PHICH) information and determining, using the decoded PHICH information, that data associated with an LTE user device is to be retransmitted and wherein decoding physical HARQ indicator channel (PHICH) data includes determining probability metrics for indicating priority among data to be retransmitted;
   performing, by the LTE multi-UE simulator, at least one HARQ data verification step for each user device of the plurality of user devices;
   and acting, by the LTE multi-UE simulator, on the verified HARQ data for each user device of the plurality of user devices.

* * * * *